United States Patent
Furuoka

[15] 3,649,099
[45] Mar. 14, 1972

[54] STEREOSCOPE EXHIBITING A PANORAME EFFECT

[72] Inventor: Hideto Furuoka, Tokyo, Japan

[73] Assignee: Kabushiki Kaisha Gakushu Kenkyusha, Tokyo, Japan

[22] Filed: Oct. 3, 1969

[21] Appl. No.: 863,570

[30] Foreign Application Priority Data

Oct. 3, 1968 Japan...................................43/71477

[52] U.S. Cl............................................................350/135
[51] Int. Cl........................................G02b 27/02, G02b 27/24
[58] Field of Search..........................................350/133–135

[56] References Cited

UNITED STATES PATENTS

| 946,339 | 1/1910 | Crocker et al..........................350/135 |
| 2,122,649 | 7/1938 | Kahn......................................350/135 |
| 1,904,867 | 4/1933 | Kurtz..................................350/133 X |
| 2,093,520 | 9/1937 | Hayashi..................................350/133 |
| 3,424,511 | 1/1969 | Ratliff, Jr............................350/135 X |

Primary Examiner—David Schonberg
Assistant Examiner—Paul A. Sacher
Attorney—Robert E. Burns

[57] ABSTRACT

A stereoscope is provided with means for advancing a film having a pair of stereoscopic images of a photographed field thereon and an optical system for continuously viewing the photographed field as the film is advanced through the stereoscope. The film has elongated stereoscopic images thereon and as the film is advanced through the stereoscope, different portions of the photographed field are made visible to the viewer thereby exhibiting a panoramic effect.

14 Claims, 14 Drawing Figures

Patented March 14, 1972  3,649,099

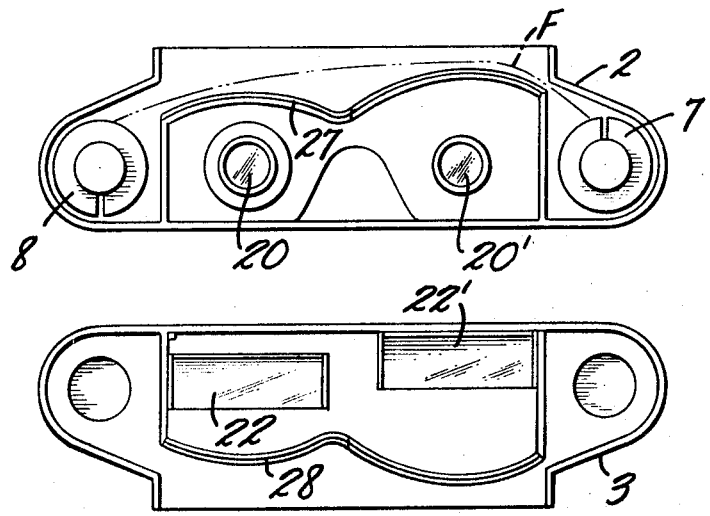
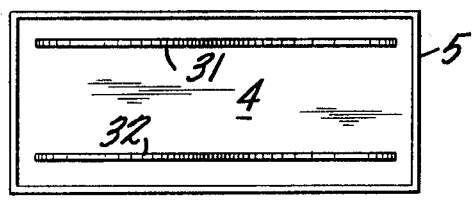
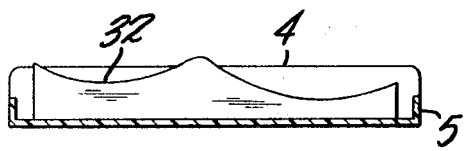
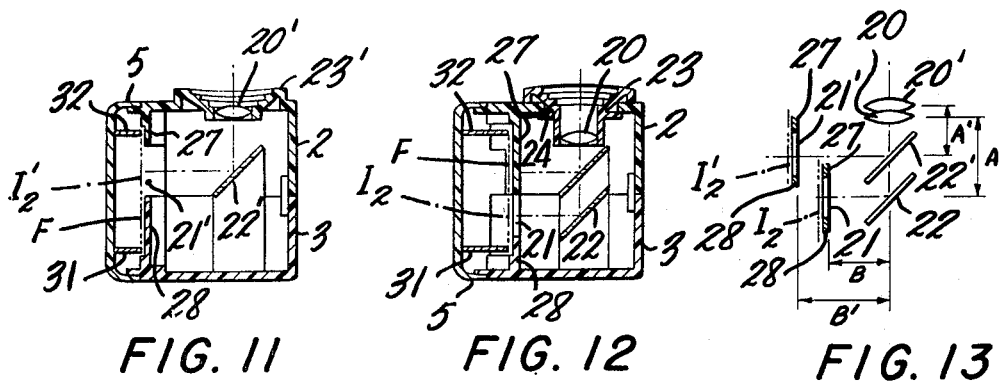
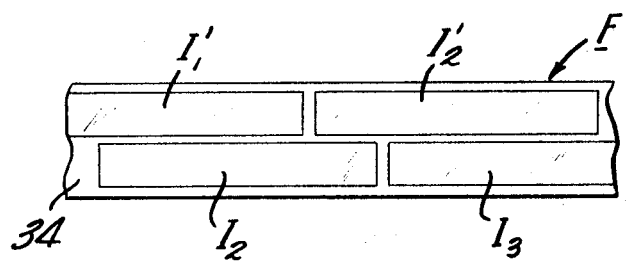

3,649,099

STEREOSCOPE EXHIBITING A PANORAME EFFECT

The present invention relates to a stereoscope for three-dimensionally viewing stereoscopic photographs. The stereoscope is provided with a pair of winding reels for advancing a film through a viewing zone. The film has thereon a series of pairs of elongated stereoscopic images of a photographed field. Each pair of elongated images are laterally or vertically spaced apart with respect to each other a predetermined distance. A stereoscopic optical means is mounted within the stereoscope and comprises two coordinated optical systems, one for each eye of the viewer, for optically transmitting the photographed field contained on each pair of elongated images to a spatial plane for viewing by a viewer. Each optical system comprises an aperture plate positioned behind the path of travel of one of the elongated images, an eye piece, and a reflector positioned to transmit the image to the eye piece. The aperture plates are vertically spaced apart by an amount equal to the lateral spacing existing between each pair of elongated stereoscopic images. In addition, the optical axis of both optical systems, as measured from the aperture to the eye piece, are of equal length.

The conventional stereoscope employs stereoscopic photographs which are selectively changed whenever the viewer wishes to see a different scene. Each stereoscopic photograph comprises two images of the same photographed field and when the photograph is placed within a stereoscope, the entire photographed field is visible at one time. The stereoscope of the present invention allows a continuously changing scene to be viewed in contrast to the individual, limited scene of the prior art stereoscopes. This panoramic effect exhibited by the stereoscope of the present invention provides a more realistic three-dimensional photograph than has heretofore been possible.

A principal object of the present invention is to provide a stereoscope which is operable to provide a continuously changing or panoramic scene.

Another object of the present invention is to provide a stereoscope which has improved realization of three-dimensional impression or distance-viewing by means of the fusion of images.

Having in mind the above and other objects that will be evident from an understanding of this disclosure, the invention comprises the devices, combinations and arrangements of parts as illustrated in the preferred embodiment of the invention which is hereinafter set forth in such detail as to enable those skilled in the art to readily understand the function, operation, construction and advantages of it when read in conjunction with the accompanying drawings.

FIG. 7 is a view looking inside of the upper casing of the stereoscope;

FIG. 8 is a view looking into the lower casing of the stereoscope;

FIG. 9 is a view in cross section of the light admitting cover;

FIG. 10 is a rear view of the light admitting cover;

FIG. 11 is a cross-sectional perspective view of the stereoscope taken along the line 11—11 in FIG. 1;

FIG. 12 is a cross-sectional perspective view of the stereoscope of the present invention taken along the line 12—12 in FIG. 1;

FIG. 13 is a schematic view illustrating the principle of operation of the optical system of the stereoscope of the present invention;

Figure 5:
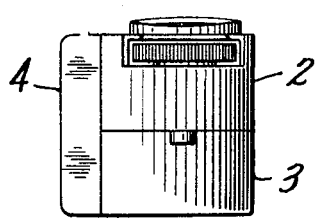
FIG. 5 is a side view of the stereoscope shown in FIG. 1 when viewed from the right side.

And FIG. 14 is a plan view of a stereoscopic film applicable for use in the stereoscope of the present invention.

DESCRIPTION OF THE PREFERRED EMBODIMENT

The stereoscope 1 of the present invention comprises an upper casing 2 releaseably connected to a lower casing 3, both casings preferably being formed of plastic material. A light admitting cover 4 formed of a milk white, translucent or transparent material is removably mounted on the casings 2 and 3 when the casings are connected together and provides a film viewing zone as described below. As seen in FIGS. 9 and 10, the light admitting cover 4 is provided with a peripheral rim 5 which fits over corresponding peripheral rims (not numbered) on the upper and lower casings. The light admitting cover 4 is removably mounted on the assembled upper and lower casings and helps hold the casing sections together.

Figure 1:
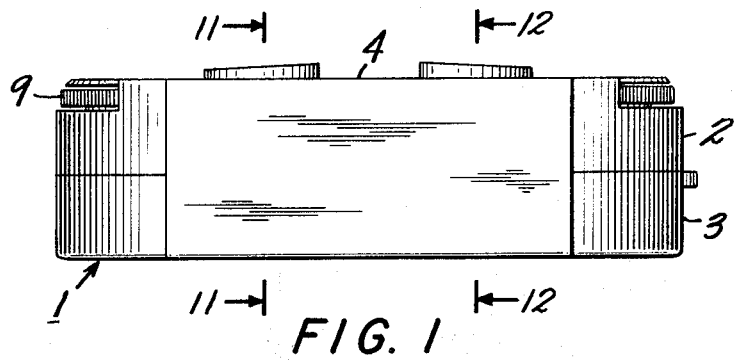
FIG. 1 is a front view of the stereoscope of the present invention.
Figure 6:
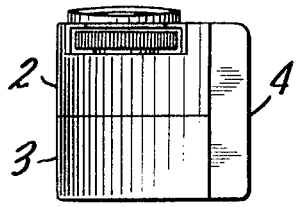
FIG. 6 is a side view of the stereoscope shown in FIG. 1 when viewed from the left side.
Figure 2:
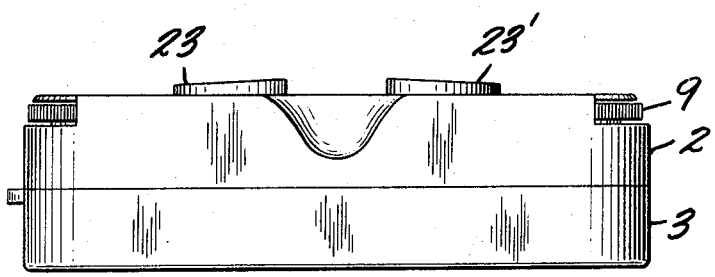
FIG. 2 is a rear view of the stereoscope shown in FIG. 1.
Figure 3:
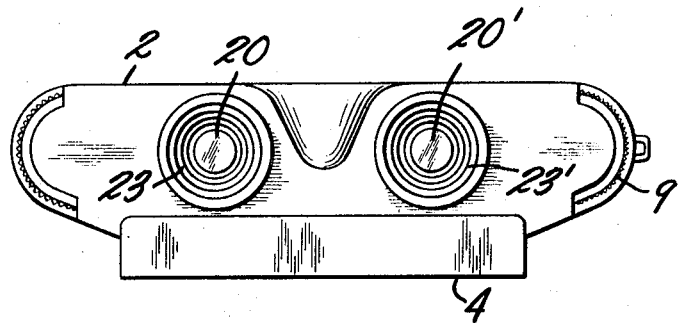
FIG. 3 is a top view of the stereoscopic shown in FIG. 1.
Figure 4:
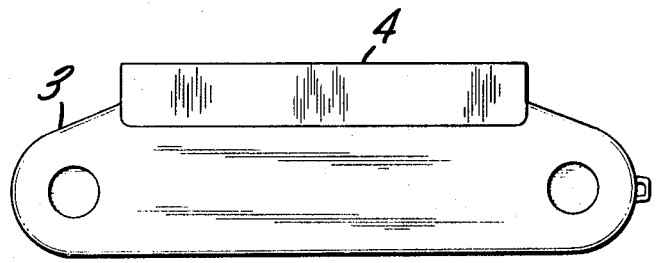
FIG. 4 is a bottom view of the stereoscope shown in FIG. 1.

A film advancing means is provided within the upper casing 2 as best seen in FIG. 7. The film advancing means comprises a pair of rotatably mounted winding reels 7 and 8 for advancing the film F through the stereoscope. The winding reels are removably mounted and have conventional holding means thereon for releaseably engaging with the film during a winding and unwinding operation. Each winding reel is provided with a knurled wheel 9 which projects out of the upper casing 2, as seen in FIG. 1, for facilitating manual rotation of the winding reels.

A stereoscopic optical means is provided within the stereoscope for optically transmitting a photographed field contained on the film F to a spatial plane for viewing by a viewer. The stereoscopic optical system is shown diagrammatically in FIG. 13 and comprises a pair of optical systems comprising a pair of magnifying lenses or eye pieces 20 and 20' optically coupled to respective apertures 21 and 21' through a pair of reflectors 22 and 22'. The apertures 21 and 21' are vertically spaced apart a predetermined distance equal to the lateral spacing between each pair of stereoscopic images, such as $I_2$ and $I_2'$ which are to be viewed. Reflector 22 is positioned such that its optical axis is a distance B from aperture 21 and a distance A from magnifying lens 20. Reflector 22' is positioned such that its optical axis is a distance B' from aperture 21' and a distance A' from magnifying lens 20'. The components are positioned such that the distance relationship $A + B = A' + B'$ exists at all times. Hence, any particular dimensions may be employed provided they adhere to the above relationship. The pair of magnifying lenses 20 and 20' are contained within carrying cylinders 23 and 23' which are mounted on the upper casing 2. The magnifying lenses are laterally spaced apart from each other a predetermined distance corresponding approximately to the human interocular distance. In addition, the carrying cylinder 23 is slidably mounted within a slot 24 so that it may be variably positioned depending upon the interocular distance of the particular viewer.

The reflectors 22 and 22' are mounted within the lower casing 3 and as aforementioned, their particular locations are preselected to ensure that the optical axis for both images are the same. The reflectors, as shown, are mirrors and obviously any other light receiving and transmitting component, such as a prism, can be used instead. The apertures 21 and 21' are formed within aperture plates 27 and 28 which constitute, respectively, extensions of the upper and lower casings. As seen in FIG. 7, the extensions 27 and 28 are similarly shaped and are composed of two curved sections each having a mutually different radius of curvature. Each radius of curvature is preselected in accordance with the positioning and dimensioning of the particular optical system with which it is associated. Aperture 21' is actually a cutout portion of the extension 27 of the upper casing 2. Likewise, the aperture 21 comprises a cutout portion of the curved extension 28. Hence, when the upper and lower casings are connected together, the cutout portions within extensions 27 and 28 will result in the apertures 21 and 21', as seen in FIG. 13. The aperture plates are actually the extensions 27 and 28.

As seen in FIGS. 9 and 10, the light admitting cover 4 functions as a guide plate for positioning and guiding the film during its travel through the stereoscope. The light admitting cover is provided with curved film guides 31 and 32 which are shaped similarly to the curvature of the aperture plates 27 and 28. When the light admitting cover is inserted on to the assembled upper and lower casings, the film guides 31 and 32 cooperate with the extensions 27 and 28 to provide therebetween a film path whereby the film can be advanced past the apertures 21 and 21'.

A piece of photographic film F for use with the stereoscope of the present invention is shown in FIG. 14. The film comprises a strip of film 34 which has thereon elongated images of a photographed field. Each individual image has a much greater lengthwise dimension than a widthwise dimension and is much longer than the conventional stereoscopic image. Image $I_2$ contains the same photographed field as does image $I_2'$ and the images are laterally spaced apart with respect to the axis of travel of the film as well as being longitudinally spaced apart. The lateral spacing between corresponding images is preselected in accordance with the vertical spacing existing between the apertures 21 and 21' and the longitudinal spacing corresponds approximately to the interocular distance.

The operation of the stereoscope will now be described. To use the stereoscope, the light admitting cover 4 is removed and the upper and lower casings are separated. The strip of film F, being already wound on one winding reel, for example reel 7, is loosley threaded in front of the aperture plates 27 and 28 and attached to the winding reel 8. Such a condition is shown in FIG. 7. The upper and lower casings are then connected together whereupon the aperture plates 27 and 28 coact to form the vertically spaced apertures 21 and 21' as seen in FIGS. 11-13. The light admitting cover 4 is then placed over the peripheral rims of the upper and lower casings such that the peripheral rim 5 of the light admitting cover is frictionally held in place. As the light admitting cover or guide plate 4 is moved into position, the film guide 31 and 32 contact the film F and effectively position it within its intended path of travel thereby defining a film viewing zone. Hence, the film is now in position to be viewed and its path of travel will assume the curvature determined by the aperture plates 27 and 28 and the film guides 31 and 32 whereby the film is maintained in a curved position such that respective ones of the correlated images are maintained in longitudinally curved positions having mutually different curvatures.

Next, the stereoscope is held in front of a light source so that light shines through the light admitting cover 4 and the winding reel 8 is rotated by means of the knurled wheel 9 to advance the film. As the film advances, a film position is reached wherein the leading edge of images $I_2$ and $I_2'$ are positioned in front of apertures 21 and 21', respectively. Then, as the film is advanced by manually rotating the winding reel 8, the images $I_2$ and $I_2'$ are continuously advanced past the apertures 21 and 21' with the result that a viewer looking through eye pieces 20 and 20' sees a continuously changing stereoscopic picture. Hence, the stereoscope of the present invention provides the user with a panoramic picture as contrasted to the prior art stereoscopes which provided only a limited field of view picture.

The novel photographic film allows the viewer to see a panoramic or continuously changing scene limited only by the longitudinal length of the images themselves. Thus, by merely rotating the winding reel 8, a continuously changing stereoscopic picture is obtained. Furthermore, since a stereoscopic photograph generally has the characteristic of being fusible to a wider extent than the vertical image difference, the stereoscope of the present invention, which assures a continuous horizontal displacement of the film, has the advantage of inherently benefiting from this characteristic property. In addition, the arcuate film path determined by the curved aperture plates and film guides has the beneficial effect of correcting the deformed images due to parallax so as to effectively produce a substantially increased range for viewing clear images and hence improves the depth impression or three-dimensional impression of the picture. Moreover, as the stereoscopic images are viewed and accordingly synthesized into one three-dimensional picture, a realistic depth impression is realized since the optical axes are equal in length and perpendicular to their respective apertures.

Hence, it can be seen that the stereoscope of the present invention provides numerous advantages over the prior art stereoscopes yet is simple in structure and rugged in nature.

What I claim and desire to secure by letters patent is:

1. In a stereoscope; means defining a film viewing zone, film advancing means for manually advancing a film having thereon a pair of laterally spaced-apart, elongated stereoscopic images of a photographed field to be viewed longitudinally through said viewing zone; and stereoscopic optical means for optically transmitting said photographed field to a viewing plane for stereoscopic viewing by a viewer continuously during advancement of said film through said viewing zone including means for maintaining respective ones of said pair of stereoscopic images in longitudinally curved positions having mutually different curvatures during viewing by a viewer to effectively enlarge the field of vision being viewed and enhance the stereoscopic effect.

2. A stereoscope according to claim 1; wherein said stereoscopic optical means comprises a first curved aperture plate having a predetermined curvature and means therein defining a first elongated aperture positioned to receive therethrough an optical image of a portion only of one of said stereoscopic images; a second curved aperture plate having a curvature different than said predetermined curvature and means therein defining a second elongated aperture positioned to receive therethrough an optical image of a portion only of the other of said stereoscopic images; first and second magnifying lenses; first means for receiving said optical image from said first aperture and transmitting same to said first magnifying lens along a first optical axis measured from said first aperture to said first magnifying lens; and second means for receiving said optical image from said second aperture and transmitting same to said second magnifying lens along a second optical axis measured from said second aperture to said second magnifying lens equal in length to said first optical axis.

3. A stereoscope according to claim 2; wherein said film advancing means comprises a pair of rotatably mounted winding reels each having means thereon for releasably engaging with said film; means rotatably mounting one of said winding reels upstream from said viewing zone; and means rotatably mounting the other of said winding reels downstream from said viewing zone.

4. A stereoscope according to claim 2 wherein said film viewing zone comprises a light admitting guide plate having means thereon shaped to conform with said first and second curved aperture plates and defining therebetween a film path for said film; and means removably mounting said guide plate in spaced-apart relationship from said first and second aperture plates to define therebetween said film path.

5. A stereoscope according to claim 4; wherein said film advancing means comprises a pair of rotatably mounted winding reels each having means thereon for releaseably engaging with said film; means rotatably mounting one of said winding reels upstream from said viewing zone; and means rotatably mounting the other of said winding reels downstream from said viewing zone.

6. In combination: a strip of photographic film having thereon a first elongated, stereoscopic image of a photographed field and a second elongated, stereoscopic image of said photographed field laterally and longitudinally spaced from said first image; means defining a film viewing zone; film advancing means for advancing said film longitudinally through said viewing zone; and stereoscopic optical means for optically transmitting said photographed field contained on said first and second images to a viewing plane for stereoscopic viewing by a viewer continuously during advancement of said film through said viewing zone including means for maintaining respective ones of said pair of stereoscopic images in longitudinally curved positions having mutually different curvatures during viewing by a viewer to effectively enlarge the field of vision being viewed and enhance the stereoscopic effect.

7. A combination according to claim 6; wherein said stereoscopic optical means comprises a first curved aperture plate having a predetermined curvature and means therein defining a first aperture positioned to receive therethrough an optical image of a portion only of said first stereoscopic image; a second curved aperture plate having a curvature different than said predetermined curvature and means therein defining a second aperture positioned to receive therethrough an optical image of a portion only of said second stereoscopic image; first and second magnifying lenses; first means for receiving said optical image from said first aperture and transmitting same to said first magnifying lens along a first optical axis measured from said first aperture to said first magnifying lens; and second means for receiving said optical image from said second aperture and transmitting same to said second magnifying lens along a second optical axis measured from said second aperture to said second magnifying lens equal in length to said first optical axis.

8. A combination according to claim 3; wherein said film advancing means comprises a pair of rotatably mounted winding reels each having means thereon for releaseably engaging with said film; means rotatably mounting one of said winding reels upstream from said viewing zone; and means rotatably mounting the other of said winding reels downstream from said viewing zone.

9. A combination according to claim 8; wherein said film viewing zone comprises a light admitting guide plate having means thereon shaped to conform with said first and second curved aperture plates and defining therebetween a film path for said film; and means removably mounting said guide plate in spaced-apart relationship from said first and second aperture plates to define therebetween said film path.

10. A stereoscope according to claim 6; wherein said film advancing means comprises a pair of rotatably mounted winding reels each having means thereon for releaseably engaging with said film; means rotatably mounting one of said winding reels upstream from said viewing zone; and means rotatably mounting the other of said winding reels downstream from said viewing zone.

11. A stereoscope according to claim 1; wherein said stereoscopic optical means comprises a first curved aperture plate having a predetermined curvature extending along the path of travel of the film and means therein defining a first elongated aperture positioned to receive therethrough an optical image of a portion of one of said stereoscopic images, a second curved aperture plate having a predetermined curvature different than the curvature of said first aperture plate extending along the path of travel of the film and means therein defining a second elongated aperture positioned to receive therethrough an optical image of a portion of the other of said stereoscopic images, and means receptive of said optical images for individually transmitting same along optical axes of equal length to said viewing plane.

12. A stereoscope according to claim 11; wherein said means for individually transmitting said optical images includes first and second mirrors disposed along respective ones of said optical axes at different distances from said first and second apertures respectively.

13. A combination according to claim 6; wherein said stereoscopic optical means comprises a first curved aperture plate having a predetermined curvature extending along the path of travel of the film and means therein defining a first elongated aperture positioned to receive therethrough an optical image of a portion of one of said stereoscopic images, a second curved aperture plate having a predetermined curvature different than the curvature of said first aperture plate extending along the path of travel of the film and means therein defining a second elongated aperture positioned to receive therethrough an optical image of a portion of the other of said stereoscopic images, and means receptive of said optical images for individually transmitting same along optical axes of equal length to said viewing plane.

14. A combination according to claim 13; wherein said means for individually transmitting said optical images includes first and second mirrors disposed along respective ones of said optical axes at different distances from said first and second apertures respectively.

* * * * *